United States Patent
Hamada et al.

[11] Patent Number: 5,806,879
[45] Date of Patent: Sep. 15, 1998

[54] AIR BAG APPARATUS FOR PASSENGER SEAT AND BAG FOLDING METHOD USED THEREFOR

[75] Inventors: Makoto Hamada, Toyota; Osamu Fukawatase, Aichi-ken, both of Japan

[73] Assignee: Toyota Jidosha Kabushiki Kaisha, Tokyo, Japan

[21] Appl. No.: 761,381

[22] Filed: Dec. 9, 1996

[30] Foreign Application Priority Data

Feb. 9, 1996 [JP] Japan ................................. 8-024484

[51] Int. Cl.[6] .......................... B60R 21/20; B60R 21/22; B60R 21/26
[52] U.S. Cl. ...................... 280/728.2; 280/732; 280/740
[58] Field of Search ............... 280/728.2, 732, 280/730.1, 728.3, 728.1, 740, 736, 742

[56] References Cited

U.S. PATENT DOCUMENTS

| | | | |
|---|---|---|---|
| 3,602,526 | 8/1971 | Brawn | 280/740 |
| 4,153,273 | 5/1979 | Risko | 280/728.2 |
| 4,332,398 | 6/1982 | Smith | 280/732 |
| 4,944,527 | 7/1990 | Bishop et al. | 280/728.2 |
| 5,178,407 | 1/1993 | Kelley | 280/728.1 |
| 5,261,692 | 11/1993 | Kneip et al. | 280/728.2 |
| 5,332,259 | 7/1994 | Conlee et al. | 280/738 |
| 5,382,048 | 1/1995 | Paxton et al. | 280/728.1 |
| 5,393,090 | 2/1995 | Shepherd et al. | 280/728.2 |
| 5,458,364 | 10/1995 | Mueller et al. | 280/728.2 |
| 5,647,608 | 7/1997 | Damman et al. | 280/732 |

FOREIGN PATENT DOCUMENTS 6-191362  7/1994  Japan .

OTHER PUBLICATIONS

Research Disclosure, No. 33533, "High Mounted Passenger Inflator Module for Vehicle Air Bag", p. 183, Mar. 1992.

*Primary Examiner*—Peter C. English
*Attorney, Agent, or Firm*—Cushman Darby & Cushman IP Group of Pillsbury Madison & Sutro LLP

[57] ABSTRACT

An air bag apparatus for a passenger seat includes: an air bag cover provided at a top portion of an instrument panel disposed on a passenger seat side of a vehicle, such that the air bag cover is capable of deploying; an air bag case disposed below the air bag cover and closed by the air bag cover; a bag accommodated in the air bag case in a folded state; and an inflator disposed in the bag and adapted to be inflated toward the passenger seat by ejecting a gas at a time of a collision, wherein the inflator is disposed in a state of being offset toward the air bag cover with respect to a depthwise intermediate portion of the air bag case, the inflator is provided such that the gas ejected from the inflator blows out in a direction toward a rear side of the vehicle, and a portion of the bag is disposed at a side of the inflator which is opposite to a side thereof facing the air bag cover.

25 Claims, 12 Drawing Sheets

AIR BAG APPARATUS FOR PASSENGER SEAT AND BAG FOLDING METHOD USED THEREFOR

BACKGROUND OF THE INVENTION

1. Field of the Invention

The present invention relates to an air bag apparatus for a passenger seat which is used as a passive vehicle occupant protecting system and to a bag folding method used therefor.

2. Description of the Related Art

Today when automobiles have increasingly come to be equipped with air bag apparatuses for driver seats as standard equipment, attempts are being made to spread the use of dual air bag apparatuses in which air bag apparatuses for passenger seats are also mounted. In this connection, air bag apparatuses for passenger seats are also being actively developed. Examples of such air bag apparatuses for passenger seats include U.S. Pat. Nos. 5, 261,692, 5,382,048, 4,332,398, and 5,332,259. It is known through accumulated experience in development that it is preferable to cause a lower portion of a bag to be inflated in a downward direction at an early period (i.e., to cause the lower portion of the bag to be inflated toward the vicinity of the occupant's waist at an early period), and to lower the inflating speed of the bag as a whole within an appropriate range. Hereafter, the former demand will be referred to as a "first demand," and the latter demand as a "second demand." The first demand is called for from the perspective of improvement of the initial restraint of the occupant, and the second demand is called for from the perspective of improvement of lowering the reaction force which the occupant receives from the bag. However, since these two demands are seemingly mutually contradictory, it is considered difficult to make them compatible. Hereafter, by referring to FIGS. 9 to 12, conventional techniques which have already been disclosed will be described on the basis of these perspectives.

It should be noted that, in the drawings, arrow FR denotes a forward direction of the vehicle, and arrow UP denotes an upward direction of the vehicle. In the conventional technique disclosed in Japanese Patent Application Laid-Open (JP-A) No. 6-191362, as shown in FIG. 9, an air bag apparatus 158 for a passenger seat is comprised of an air bag cover 150 disposed at a top portion of an instrument panel in such a manner as to be capable of deploying; a box-shaped air bag case 152 disposed below the air bag cover 150; an inflator 154 disposed in the air bag case to eject gases during a collision; and a bag 156 disposed in the air bag case 152 in a folded state and adapted to be inflated by the gases ejected from the inflator 154. In this respect, this air bag apparatus for a passenger seat has an arrangement similar to the arrangements of other air bag apparatuses for passenger seats.

A first characteristic of this air bag apparatus 158 for a passenger seat lies in that the inflator 154 is disposed at a position close to a front wall 152A and a bottom wall 152B from a central portion of the air bag case 152, and most of the bag 156 is accommodated between a rear wall 152C of the air bag case 152 and the inflator 154. Further, a second characteristic lies in that the direction of ejection of the gases from the inflator 154 is restricted to directions, i.e., a forwardly diagonally upward direction and a rearwardly diagonally downward direction.

The reason for the above-described arrangement is to improve the conventional form of inflation in which a central portion of the bag is first inflated, and a peripheral portion of the bag is inflated in a delayed manner. Accordingly, with the above-described arrangement, as shown in FIG. 10, it is possible to obtain an effect that a lower portion 156A and an upper portion 156B of the bag 156 are first inflated, and a central portion 156C of the bag 156 is inflated in a delayed manner, so as to improve the restraint of the occupant.

If this arrangement is considered from the above-described perspective, it is considered that since the inflator 154 is disposed on the vehicle forward side of the air bag case 152 and most of the bag 156 is disposed on the vehicle rear side of the air bag case 152, unless the internal pressure of the bag 156 reaches a fairly high level, a breaking load does not act on a breaking portion located on the rear side of the air bag cover 150, and the bag 156 after the breaking is inflated at a stroke while assuming the aforementioned form of inflation. Therefore, with this arrangement, it is impossible to meet the second demand. In addition, the fact that the air bag cover 150 is not broken unless the internal pressure of the bag 156 reaches a fairly high level means that time is lost by that margin, so that it is presumably impossible to meet the first demand as well. Incidentally, with this arrangement, since the inflator 154 and the bag 156 are juxtaposed at the front and the rear, an opening for installation of the air bag cover which is provided at the instrument panel becomes large, entailing disadvantages in that the quality of appearance in terms of a decorative design declines, and restrictions in design become large.

In contrast, the arrangement of the conventional technique disclosed in U.S. Pat. No. 5,382,048 is similar to that of the above-described publication in that, as shown in FIG. 11, an air bag apparatus 168 for a passenger seat is comprised of an air bag cover 160; an air bag case 162; an inflator 164; and a bag 166. However, this air bag apparatus 168 for a passenger seat is characterized in a method of folding the bag 166 (a method of folding the bag 166 was changed). That is, according to this folding method, as shown in FIG. 12, the bag 166 in a folded form is comprised of a loop portion 166A; a large-diameter roll portion 166B disposed adjacent to the loop portion 166A; and a small-diameter second roll portion (not shown) which is wound inside the first roll portion 166B.

With the above-described arrangement, in an initial period of inflation of the bag 166, the loop portion 166A is first inflated so as to deploy the air bag cover 160 and drive away the first roll portion 166B in a rearwardly downward direction (in the state shown by the chain line in FIG. 11). Next, the first roll portion 166B is unwound, and the second roll portion is then unwound. Consequently, the bag 166 finally assumes a state indicated by the solid line. Thus, with the above-described arrangement, regularity is imparted to the order of deployment by making the folded shape a multiple stage, thereby to lower the inflating speed of the bag 166.

If this arrangement is considered from the above-described perspective, it seems that that the first and second demands are made compatible. However, since it can be estimated that the bag 166 is disposed on top of the inflator 164 (see the two-dotted dash line in FIG. 11), it is necessary to cause the bag 166 to expand against its own weight and then break the air bag cover 160 to deploy. For this reason, the internal pressure of the bag 166 must be increased to a sufficiently high level. In this sense, it is considered that the overall inflating speed of the bag 166 is fast contrary to the intention of the designer. Accordingly, with this arrangement as well, it is impossible to meet the second demand. In addition, the fact that the internal pressure of the bag 166 need to be increased to a sufficiently high level means that time will be lost by that margin as described above, so that it is presumably impossible to meet the first demand as well. Incidentally, with this arrangement, it is possible to overcome the disadvantages of the decline in the quality of appearance in terms of the decorative design and restrictions in design becoming large, which are encountered in the above-described conventional art.

As described above, even with the arrangements of both air bag apparatuses 158 and 168 for passenger seats, it is impossible to make the first and second demands compatible, which testifies to the difficulty of making compatible the seemingly mutually contradictory items.

SUMMARY OF THE INVENTION

In view of the above-described circumstances, it is an object of the present invention to provide an air bag apparatus for a passenger seat which is capable of making compatible the early downward inflation of the lower portion of the bag and the lowering of the inflating speed of the overall bag within an appropriate range, as well as a bag folding method which is applied to the same.

To this end, in accordance with a first aspect of the present invention, there is provided an air bag apparatus for a passenger seat, comprising: an air bag cover provided at a top portion of an instrument panel disposed on a passenger seat side of a vehicle, such that the air bag cover is capable of deploying; an air bag case disposed below the air bag cover and closed by the air bag cover; a bag accommodated in the air bag case in a folded state; and an inflator disposed in the bag and adapted to be inflated toward the passenger seat by ejecting a gas at a time of a collision, wherein the inflator is disposed in a state of being offset toward the air bag cover with respect to a depthwise intermediate portion of the air bag case, the inflator is provided such that the gas ejected from the inflator blows out in a direction toward a rear side of the vehicle, and a portion of the bag is disposed at a side of the inflator which is opposite to a side thereof facing the air bag cover.

In accordance with a second aspect of the present invention, the air bag apparatus for a passenger seat according to the first aspect of the invention further comprises: rectifying means disposed around the inflator and having a rectifying port for rectifying the gas ejected from the inflator, the rectifying port being disposed at a position offset toward the rear side of the vehicle with respect to a top surface portion of the rectifying means.

In accordance with a third aspect of the present invention, in the air bag apparatus for a passenger seat according to the second aspect of the invention, the rectifying port has an eaves portion which is disposed on an upper edge side thereof and projects in the direction toward the rear side of the vehicle.

In accordance with a fourth aspect of the present invention, in the air bag apparatus for a passenger seat according to the second and third aspects of the invention, the rectifying means has deflecting means at the top surface portion thereof, and the deflecting means deflects, in the transverse direction of the vehicle, a portion of the flow of the gas ejected from the inflator.

In accordance with a fifth aspect of the present invention, in the air bag apparatus for a passenger seat according to the first and second aspects of the invention, the air bag case is made of cloth.

In accordance with a sixth aspect of the present invention, in the air bag apparatus for a passenger seat according to the first and fifth aspects of the invention, the air bag case includes a bottom wall portion, a front wall portion, a rear wall portion, and a pair of side wall portions, and the air bag case is provided such that a portion of the bag disposed at the side of the inflator which is opposite to the side thereof facing the air bag cover is held by the bottom wall portion, the front wall portion, and the rear wall portion.

In accordance with a seventh aspect of the present invention, in the air bag apparatus for a passenger seat according to the sixth aspect of the invention, the air bag case and the rectifying means are formed such that a distance between the front wall portion of the air bag case and a front-side outer peripheral surface of the rectifying means and a distance between the rear wall portion of the air bag case and a rear-side outer peripheral surface of the rectifying means are set to be larger than the thickness of the bag in a folded state which is disposed between these portions.

In accordance with an eighth aspect of the present invention, there is provided a method of folding a bag which is applied to an air bag apparatus for a passenger seat according to the second to fourth aspects of the invention, comprising the steps of: folding as a first step a pair of side portions of the bag which are widthwise lateral portions of the bag, in the form of belts along predetermined primary folding lines such that the width of the bag after folding coincides substantially with the width of the rectifying means in a state in which the rectifying means is inserted in a substantially central portion of the bag, thereby setting the bag in a primarily-folded state; and folding as a second step another pair of side portions whose direction of orientation is perpendicular to that of the pair of side portions of the bag which are the widthwise lateral portions of the bag with respect to the bag in the primarily-folded state, along predetermined secondary folding lines which are perpendicular to the primary folding lines, so as to dispose folded end portions of the other pair of side portions at a side of the rectifying means which is opposite to a side thereof facing the air bag cover, thereby setting the bag in a secondarily-folded state.

In accordance with the first aspect of the present invention, at the time of a collision, gases are ejected from the inflator, and the gases flow into the bag. For this reason, the bag is inflated and exerts an inflating pressure on the air bag cover. Consequently, the air bag cover deploys, and the bag is concurrently inflated toward the passenger seat side.

Here, in the present invention, since the inflator is disposed in a state of being offset toward the air bag cover with respect to a depthwise intermediate portion of the air bag case, and a portion of the bag is disposed on a side of the inflator which is opposite to a side thereof facing the air bag cover, only the remaining portion of the bag is present between the inflator and the air bag cover. For this reason, the gas pressure from the inflator directly acts on the air bag cover through the remaining portion of the bag. Accordingly, in accordance with the present invention, the air bag cover can be deployed speedily at a stage where the internal pressure of the overall bag is relatively low.

Moreover, in the present invention, since the arrangement provided is such that the gas ejected from the inflator blows out in a direction toward the rear side of the vehicle, the lower portion of the bag can be inflated in a direction toward the rear side of the vehicle and diagonally downward at an early period. Further, it is possible to obtain an outstanding advantage in that the inflating speed of the overall bag can be lowered within an appropriate range.

In accordance with the second aspect of the present invention, in the first aspect of the invention, rectifying means having a rectifying port for rectifying the gas ejected from the inflator is provided around the inflator, and the rectifying port is disposed at a position offset toward the rear side of the vehicle with respect to a top surface portion of the rectifying means. Therefore, the gas ejected from the inflator can be caused to flow out smoothly and efficiently in the direction toward the rear side of the vehicle. Accordingly, outstanding advantages can be obtained in that it is possible to promote the speeding up of the timing of deployment of the air bag cover, and promote early downward inflation of the lower portion of the bag.

In accordance with the third aspect of the present invention, in the second aspect of the invention, since an eaves portion is disposed on an upper edge side in such a manner as to project in the direction toward the rear side of the vehicle, the gas ejected from the inflator flows out after being rectified in a direction toward the rear side of the vehicle more smoothly and efficiently. That is, if the eaves portion is not provided, the gas ejected from the inflator flows out from the rectifying port of the rectifying means radially with a certain angle. However, if the eaves portion is provided, the portion of the gas which should flow out radially strikes against the eaves portion, and linearly flows out in the direction toward the rear side of the vehicle. Accordingly, the gas ejected from the inflator flows out after being rectified in the direction toward the rear side of the vehicle more smoothly and efficiently. Furthermore, outstanding advantages can hence be obtained in that it is possible to further promote the speeding up of the timing of deployment of the air bag cover and early downward inflation of the lower portion of the bag.

In accordance with the fourth aspect of the present invention, in the second and third aspects of the invention, since deflecting means is provided at the top surface portion thereof so as to deflect part of the flow of the gas ejected from the inflator, the bag in the folded state can easily unfold. For this reason, the bag is inflated in the transverse direction of the vehicle as well, and inflation proceeds in a form similar to that of a final inflated shape from an early stage of inflation. As a result, an outstanding advantage can be obtained in that it is possible to improve the performance of restraining the vehicle occupant.

In accordance with the fifth aspect of the present invention, in the first and second aspects of the invention, since the air bag case is made of cloth, as compared with a case where the air bag case is made of a metal, the ar bag case can be made very flexible, and the degree of freedom in designing the shape can be enhanced. For this reason, it is unnecessary to pay heed to interference between the air bag case and surrounding parts at the time of mounting the apparatus in a vehicle. In addition, since the air bag cover is very flexible as described above, the gap with the surrounding parts can be made narrow. Hence, an outstanding advantage is obtained in that it is possible to improve the accommodating feature and the operating efficiency in assembling functional parts such as the inflator.

In addition, in accordance with the present invention, since the air bag case is made of cloth, an outstanding advantage is offered in that it is possible to facilitate the manufacture and making the apparatus lightweight.

In accordance with the sixth aspect of the present invention, in the first and fifth aspects of the invention, since a portion of the bag disposed on the side of the inflator which is opposite to the side thereof facing the air bag cover is held by the bottom wall portion, the front wall portion, and the rear wall portion, the holding of the shape of part of the bag in the folded state can be facilitated, and it is possible to prevent part of the bag from being inflated away from the air bag cover side. Consequently, an outstanding advantage can be obtained in that it is possible to favorably maintain the shape-retaining characteristic and the inflation performance of the bag.

In accordance with the seventh aspect of the present invention, in the sixth aspect of the invention, since the distance between the front wall portion of the air bag case and a front-side outer peripheral surface of the rectifying means and the distance between the rear wall portion of the air bag case and a rear-side outer peripheral surface of the rectifying means are set to be larger than the thickness of the bag in a folded state which is disposed between these portions, it is possible to reduce the inflation resistance at the time of inflation of part of the bag which is disposed on the side of the inflator which is opposite to the side thereof facing the air bag cover. For this reason, it is possible to obtain an outstanding advantage in that the bag can be inflated smoothly.

The eighth aspect of the present invention is applied to the air bag apparatus for a passenger seat in the above-described second to fourth aspects of the invention. Specifically, in the first step, a pair of side portions of the bag which are widthwise lateral portions of the bag are folded in the form of belts along predetermined primary folding lines such that the width of the bag after folding coincides substantially with the width of the rectifying means in a state in which the rectifying means is inserted in a substantially central portion of the bag. As a result, the bag is folded in a primarily-folded state. Next, in the second step, another pair of side portions are folded along predetermined secondary folding lines which are perpendicular to the primary folding lines, so as to lead folded end portions of the other pair of side portions toward the front side of the rectifying means. As a result, the bag is set in a secondarily-folded state. Consequently, by simply folding the bag in two stages, it is possible to obtain a folded state in which part of the bag is disposed on the side of the rectifying means which is opposite to the side thereof facing the air bag cover. Thus, outstanding advantages can be obtained in that it is possible to facilitate the operation of folding the bag and making the folded bag compact.

The above and other objects, features and advantages of the present invention will become more apparent from the following detailed description of the invention when read in conjunction with the accompanying drawings.

DESCRIPTION OF THE PREFERRED EMBODIMENTS

Figure 1:
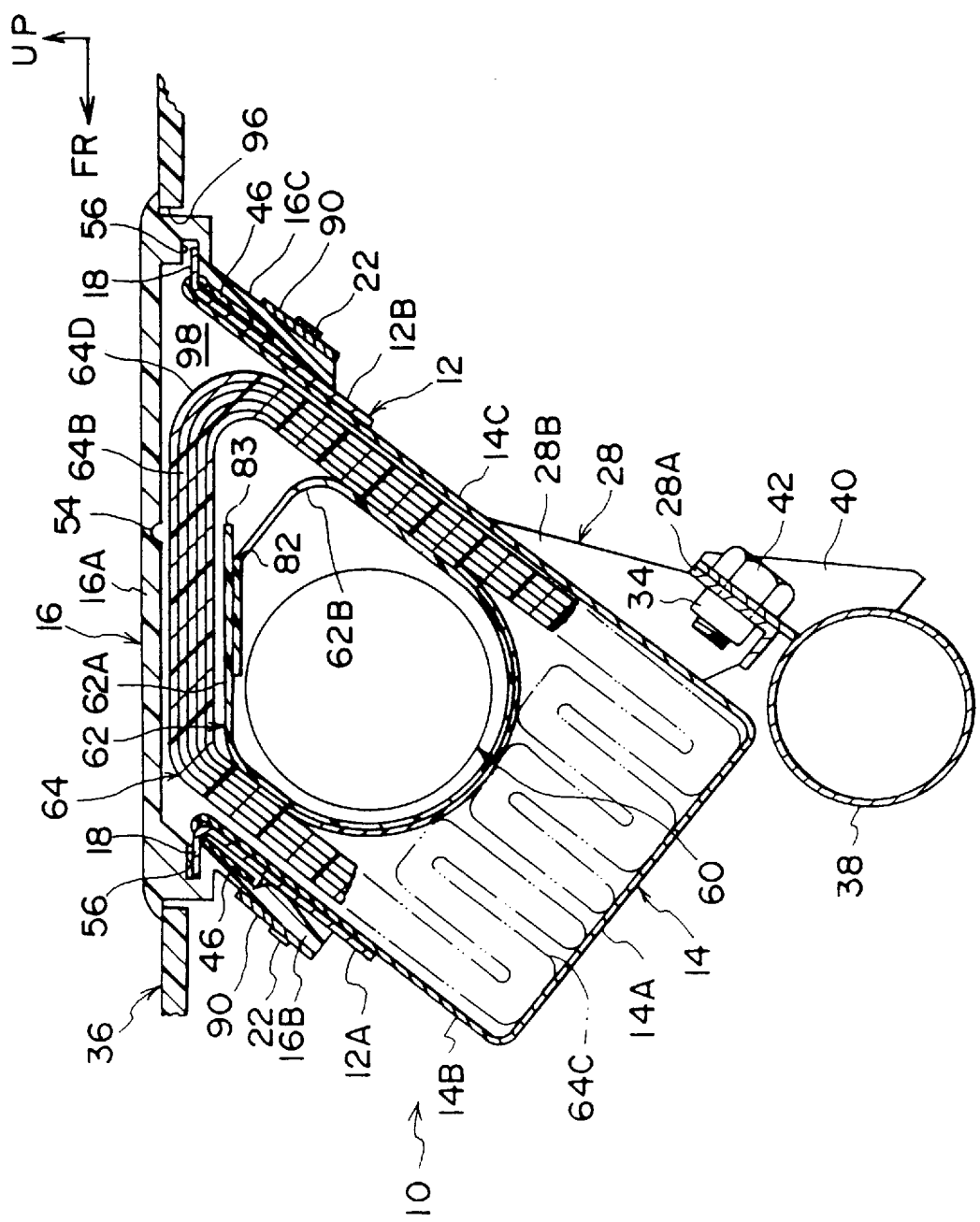
FIG. 1 is an enlarged cross-sectional view taken along line 1—1 in FIG. 3, and illustrates a vertical cross-sectional structure of an air bag apparatus for a passenger seat in accordance with an embodiment of the present invention.

Referring now to FIGS. 1 to 8, a description will be given of an embodiment of the present invention. It should be noted that, in the drawings, arrow FR denotes a forward direction of the vehicle; arrow UP denotes an upward direction of the vehicle; and arrow IN denotes a transversely inward direction of the vehicle.

Figure 4:
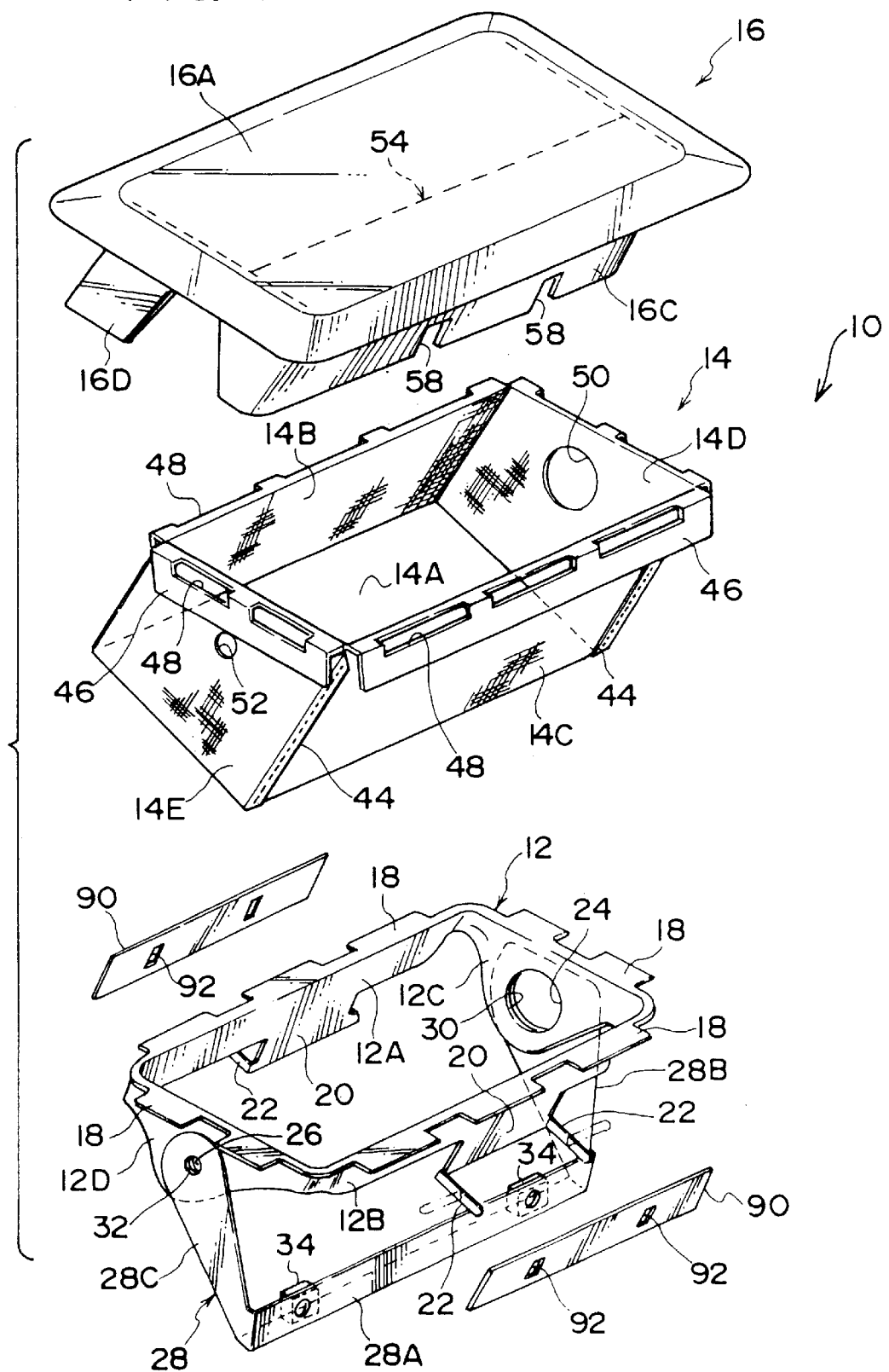
FIG. 4 is an exploded perspective view of component parts constituting an outer frame of the air bag apparatus for a passenger seat shown in FIG. 1.
Figure 5:
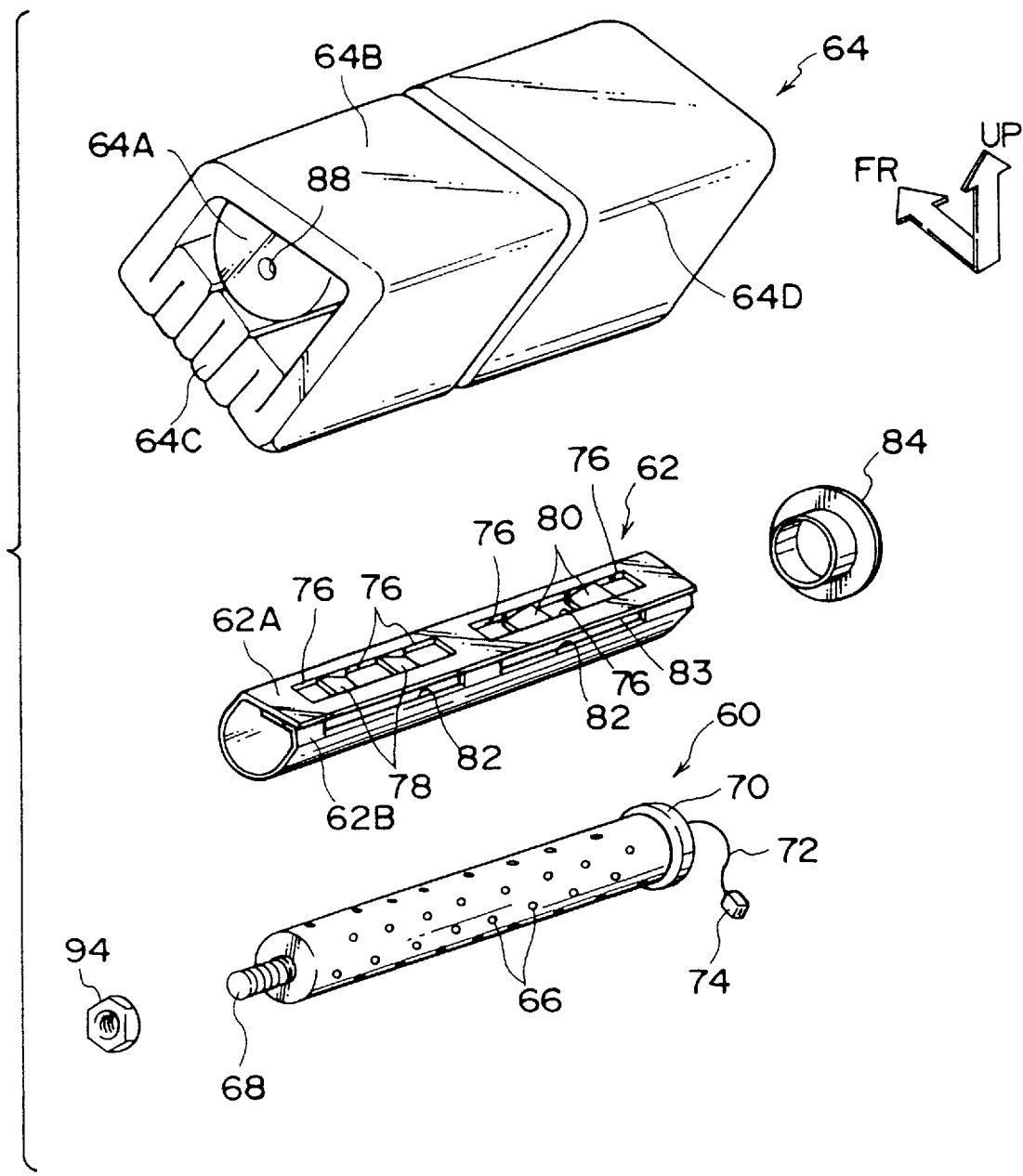
FIG. 5 is an exploded perspective view of functional parts of the air bag apparatus for a passenger seat shown in FIG. 1.

FIGS. 4 and 5 show exploded perspective views of an air bag apparatus 10 for a passenger seat of a so-called top dashboard type in accordance with the embodiment.

Referring first to FIG. 4, a description will be given of members which constitute outer portions of the air bag apparatus 10 for a passenger seat. As shown in the drawing, the outer portions of the air bag apparatus 10 for a passenger seat are constituted by a metal baseplate 12 serving as an attaching member, an accommodating case 14 made of cloth, and an air bag cover 16 made of a resin. Hereafter, a description will be given of these constituent members in order.

The baseplate 12 is formed substantially in the shape of a frame consisting of a front wall portion 12A, a rear wall portion 12B, and side wall portions 12C and 12D. Upper end portions of the front wall portion 12A, the rear wall portion 12B, and the side wall portions 12C and 12D are respectively bent outwardly. The bent portions are cut out in rectangular shapes at appropriate intervals, thereby forming rectangular flanges 18. Incidentally, the longitudinal dimension of each flange 18 is set in such a manner as to substantially match the longitudinal dimension of each insertion hole 48 formed in the accommodating case 14 which will be described later. In addition, a pair of extending portions 20 are respectively formed at longitudinally intermediate portions of the front wall portion 12A and the rear wall portion 12B in such a manner as to extend downward. Meanwhile, two pairs of narrow pawls 22, which project in parallel in the forward direction and the rearward direction, are respectively formed at opposite side portions of the respective extending portions 20 (i.e., opposite side portions as viewed in directions along the longitudinal directions of the front wall portion 12A and the rear wall portion 12B). Further, a large-diameter hole 24 is formed in one side wall portion 12C, while a small-diameter hole 26 (see FIG. 2) is formed in the other side wall portion 12D. The large-diameter hole 24 and the small-diameter hole 26 are formed coaxially.

Figure 6:
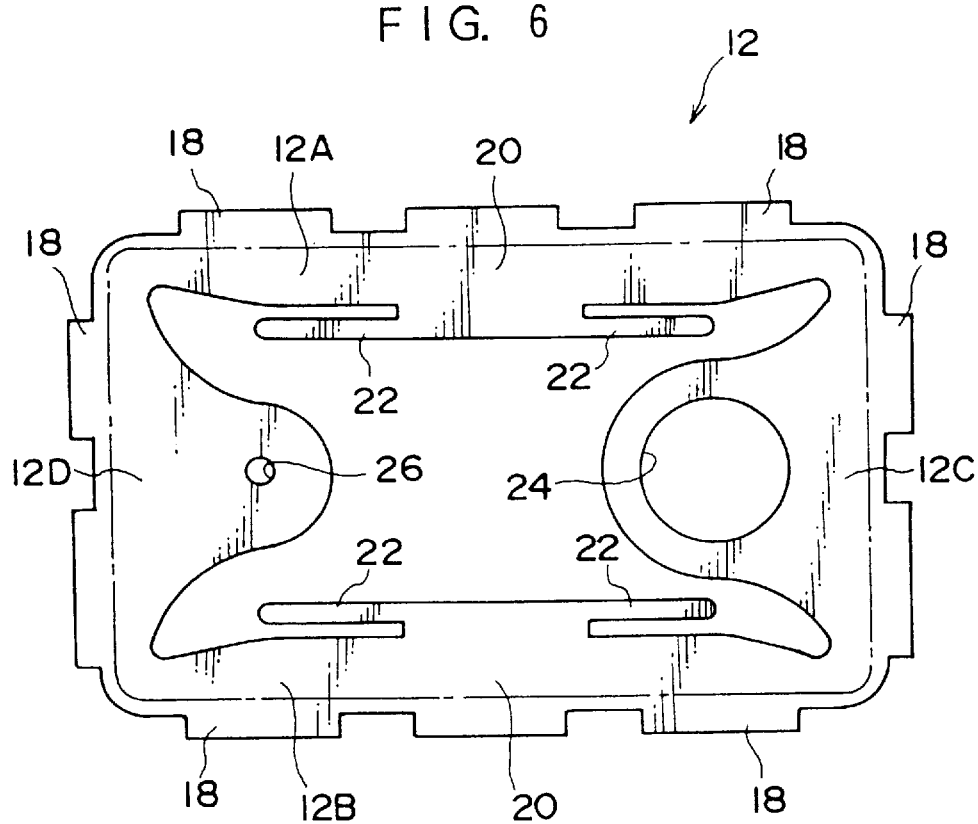
FIG. 6 is a plan view illustrating a base plate, shown in FIG. 4, in a state in which it is developed in a plan form immediately after blanking by a press.

The baseplate 12 having the above-described arrangement is fabricated as follows: First, the baseplate 12 which is developed in a plan form, as shown in FIG. 6, is blanked out from an unillustrated base material by a press. Next, the blank is subjected to bending along the chain line in appropriate directions so as to form the front wall portion 12A, the rear wall portion 12B, the side wall portions 12C and 12D, and the flanges 18. Subsequently, the pawls 22 are bent at their roots. The above-described baseplate 12 is thus formed.

Returning to FIG. 4, a metallic attaching bracket 28 for mounting on a vehicle body and serving as an attaching member is attached to the baseplate 12 described above. Specifically, the attaching bracket 28 is comprised of a narrow supporting portion 28A having an L-shaped cross section and disposed in parallel with the planar direction of the rear wall portion 12B of the baseplate 12; and arm portions 28B and 28C which respectively extend from the longitudinally opposite ends of the supporting portion 28A toward the pair of side wall portions 12C and 12D of the baseplate 12. Of these portions, the pair of arm portions 28B and 28C are brought into close contact with the pair of side wall portions 12C and 12D of the baseplate 12, and are attached to the side wall portions 12C and 12D in this state by an attaching means such as welding. A large-diameter hole 30 having the same diameter as that of the aforementioned large-diameter hole 24 is formed in one arm portion 28B, while a small-diameter hole 32 having the same diameter as that of the aforementioned small-diameter hole 26 is formed in the other arm portion 28C. Further, a pair of weld nuts 34 are welded to both sides of the front surface of the supporting portion 28A.

A mount bracket 40, which is substantially triangular in a side-elevational view and U-shaped in a plan view, is attached, by an attaching means such as welding, to a pipe-shaped instrument panel reinforcement 38 which is disposed inside an instrument panel 36 (see FIG. 1) along the transverse direction of the vehicle, in correspondence with the aforementioned attaching bracket 28. The mount bracket 40 and the supporting portion 28A of the attaching bracket 28 are brought into close contact with each other, and attaching bolts 42 are threadedly engaged with the respective weld nuts 34 in this state, thereby fixing the baseplate 12 to the instrument panel reinforcement 38.

The accommodating case 14 is formed as follows: First, the accommodating case 14 which is developed in a plan form and is comprised of a bottom portion 14A, a front portion 14B, a rear portion and 14C side portions 14D and 14E, is cut out from a planar cloth material. Next, the front portion 14B, the rear portion 14C, and the side portions 14D and 14E are respectively turned up in the same direction at the front and rear edges and opposite side edges of the bottom portion 14A. Then, margins to seam 44 which are provided at the respective front and rear edges of the side portions 14D and 14E are turned up toward the front portion 14B and the rear portion 14C, and are sewn up. The box-shaped accommodating case 14 with its upper side open is thus formed.

Further, turned-down portions 46 are respectively formed at upper ends of the front portion 14B, the rear portion 14C, and the side portions 14D and 14E of the accommodating case 14, and these turned-down portions 46 are turned down in mutually opposite directions. The insertion holes 48 in the form of rectangular slits are formed at a plurality of locations in each turned-down portion 46. In addition, a large-diameter hole 50 is formed in one side portion 14D, while a small-diameter hole 52 is formed in the other side portion 14E. When the accommodating case 14 is fitted to the baseplate 12 and the attaching bracket 28, the large-diameter hole 50 and the small-diameter hole 52 are arranged coaxially with their large-diameter holes 24 and 30 and small-diameter holes 26 and 32, and set to the same diameters as their diameters.

The air bag cover 16 is comprised of a tabular top wall 16A capable of closing the opening of the accommodating case 14; a front wall 16B (see FIG. 1) and a rear wall 16C which are respectively inclined with respect to the planar direction of the top wall 16A from the vicinities of a front end and a rear end of the top wall 16A, and extend in parallel with each other; and side walls 16D (only one side wall 16D is illustrated, and the other side wall 16D is not illustrated) which are respectively inclined forward from opposite sides of the top wall 16A, and extend parallel with each other. A breaking portion 54, which is provided with a thin wall thickness and is formed substantially in an H-shape in a plan view, is formed in the top wall 16A. In addition, slit-like retaining grooves 56 (see FIG. 1), into which the flanges 18 of the baseplate 12 can be inserted, are formed in inner peripheral portions of the top wall 16A. Further, a pair of rectangular grooves 58 are respectively formed in the front wall 16B and the rear wall 16C.

Referring now to FIG. 5, a description will be given of functional parts which are accommodated in the accommodating case 14 of the air bag apparatus 10 for a passenger seat described above. As shown in this drawing, the functional parts of the air bag apparatus 10 for a passenger seat include a metallic inflator 60, a diffuser 62 made of a resin, and a bag 64 made of a resin. Hereafter, a description will be given of these functional parts in order.

The inflator 60 has a substantially hollow cylindrical shape, and a multiplicity of gas ports 66 are formed in its peripheral wall portion. A threaded portion 68 on a periphery of which an external thread is formed is disposed projectingly and coaxially at one axial end of the inflator 60, while a disk-shaped flange 70 having a diameter larger than that of the peripheral wall portion is secured to the other end by an attaching means such as welding or threaded engagement so as to close the other end (open side end). Wire harness 72 and a connector 74 for energization are led out from an axial portion of the flange 70.

The inflator 60 used in this embodiment is of an electric ignition type. In the case of a gas generating agent sealed-in type, main constituent elements of the inflator 60 include a squib to which a predetermined electric current is applied via the wire harness 72 during a collision and serves as an igniter; a gas generating agent which burns by the heat from the squib and generates a nitrogen gas; and a filter which surrounds the gas generating agent and effects the cooling of the generated gas and removal and the like of broken pieces. Meanwhile, in the case of a high-pressure gas sealed-in type, main constituent elements of the inflator 60 include a partition for sealing in a mixed gas of argon and helium in a state of high pressure; the aforementioned squib disposed in the partition; and a breaking means for breaking the partition by making use of the heat from the squib.

Described above are schematic configurations of the inflators 60 of the electric ignition type; however, it is possible to use an inflator of a mechanical ignition type in which the state of collision of a vehicle is detected by an acceleration sensor to eject gases.

The diffuser 62 is formed by bending a base material having the shape of a rectangular flat plate into a substantially hollow cylindrical shape and by securing overlapping end portions thereof. The above-described inflator 60 is inserted in the diffuser 62. A top portion 62A of the diffuser 62 is formed into a flat surface, and a plurality of openings 76 are formed at the top portion 62A. In addition, a plurality of deflecting plates 78 and 80 are respectively juxtaposed in the openings 76. The deflecting plates 78 and the deflecting plates 80 are disposed such that their directions of inclination (i.e., rectifying directions) become laterally symmetrical by using as a reference a longitudinally intermediate portion of the diffuser 62. In addition, an inclined portion 62B having an inclined surface with a predetermined angle of inclination is provided continuously at a rear side of the top portion 62A of the diffuser 62. A pair of openings 82 having elongated rectangular shapes are juxtaposed in the longitudinal direction in the inclined portion 62B. Further, an eaves portion 83 projects from the top portion 62A in a direction toward the rear side of the vehicle in an assembled state in such a manner as to be located at upper edge sides of these openings 82. Incidentally, the eaves portion 83 is formed simultaneously when the base material for forming the diffuser 62 is bent in a substantially hollow cylindrical shape.

When the diffuser 62 constructed as described above is used, a main stream gas ejected from the inflator 60 flows out from the pair of openings 82 in a direction toward the rear side of the vehicle, while an auxiliary stream gas flows out from the openings 76 in such a manner as to be deflected in the leftward and rightward directions by the deflecting plates 78 and 80. Although one longitudinal end of the diffuser 62 is open, a holding ring 84 whose cross sectional shape at its peripheral portion is L-shaped is fitted in the other end of the diffuser 62 in a state close to a press-fitted state. However, reference will be made to this aspect in the description of the assembling procedure which will be described later.

Figure 7A:
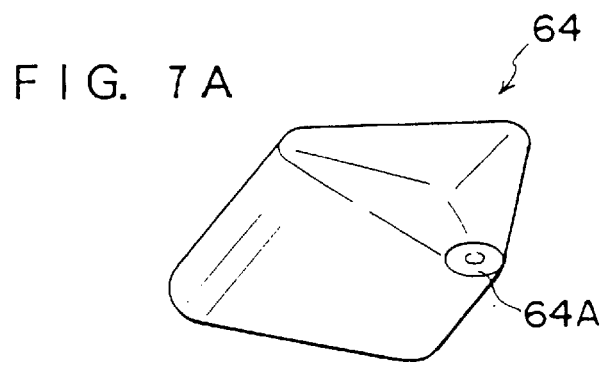
FIG. 7A is a perspective view illustrating the shape of a bag shown in FIG. 5.

The bag 64 is formed such that its folded state assumes a state of a substantially trapezoidal prism. Hereafter, referring to FIGS. 7A to 7E, a description will be given of a method of folding the bag 64. FIG. 7A shows a developed state of the bag 64 (incidentally, this drawing does not show a completely inflated shape of the bag 64 during a collision, but shows an incompletely inflated shape for ascertaining an image of the bag 64 in a solid state). A hollow cylindrical holding portion 64A is formed in advance in the bag 64 at a lower end thereof in such a manner as to extend between longitudinal ends of the bag 64. A large-diameter hole 86 (see FIG. 2) is formed at one end of the holding portion 64A, and a small-diameter hole 88 is formed at the other end thereof.

Figure 7B:
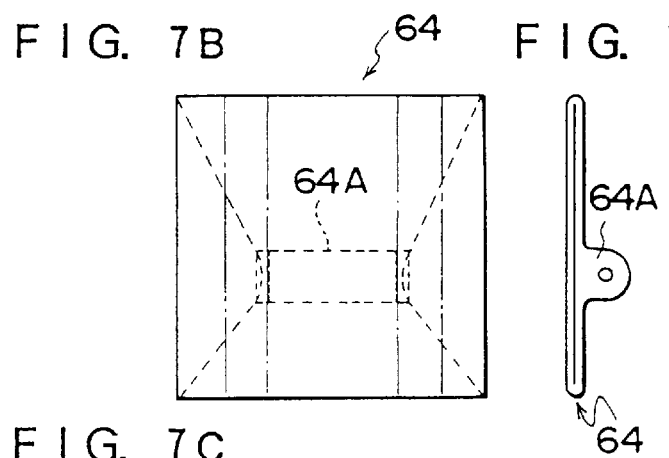
FIG. 7B is a plan view illustrating the shape when the air inside the bag is removed.
Figures 7D, 7F:
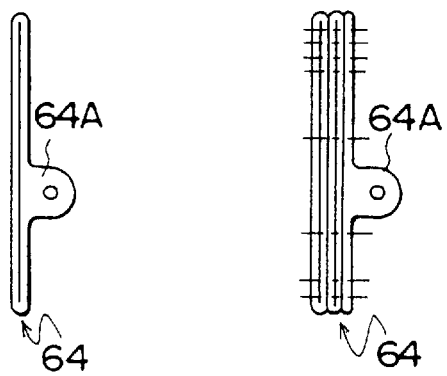
FIG. 7D is a side elevational view of FIG. 7B.
FIG. 7F is a side elevational view of FIG. 7E.
Figure 7C:
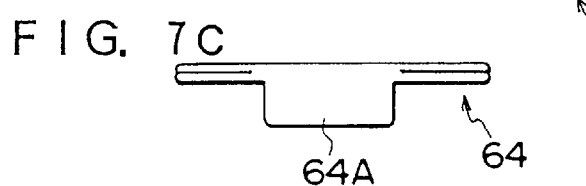
FIG. 7C is a front elevational view of FIG. 7B.
Figure 7E:
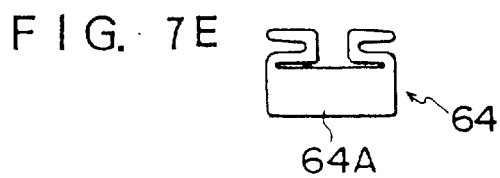
FIG. 7E is a front elevational view illustrating a state in which the bag is folded at the positions indicated by the chain lines in FIG. 7B.
Figure 7G:
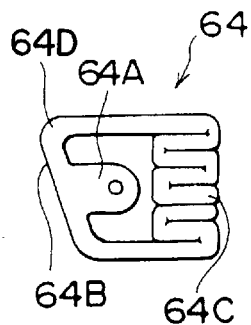
FIG. 7G is a side elevational view illustrating a state in which the bag is further folded at the positions indicated by the chain lines in FIG. 7F.

First, the internal air is removed through the large-diameter hole 86 and the small-diameter hole 88 of the bag 64 shown in FIG. 7A, so that the bag 64 is set in a planar state in which two layers of base cloth are brought into close contact with each other, as respectively illustrated in a plan view shown in FIG. 7B, a front elevational view shown in FIG. 7C, and a side elevational view shown in FIG. 7D. Next, as a pair of side portions of the bag 64 in this state are folded and folded back at positions indicated by the chain lines serving as primary folding lines shown in FIG. 7B, the bag 64 is set in a primarily-folded state, as illustrated in a front elevational view shown in FIG. 7E and a side elevational view shown in FIG. 7F (the above step corresponds to a "first step"). Then, as another pair of side portions of the bag 64 which extend perpendicularly to the first mentioned pair of side portions are folded and folded back at positions indicated by the chain lines serving as secondary folding lines shown in FIG. 7F, the bag 64 is set in a secondarily-folded state, as illustrated in a side elevational view shown in FIG. 7G (the above step corresponds to a "second step"). Consequently, as shown in FIG. 5, the bag 64 having the shape of a substantially trapezoidal prism is formed in which a bag rear portion 64B as one portion of the bag is formed thinly, while a bag front portion 64C as another portion of the bag is folded in a zigzag manner as shown in FIG. 7G and is formed thickly, and the aforementioned holding portion 64A is disposed between the bag front portion 64C and the bag rear portion 64B. Incidentally, the bag front portion 64C may be wound in roll form instead of being folded up.

Next, a description will be given of the arrangement of the air bag apparatus 10 for a passenger seat in accordance with this embodiment in a state in which the mounting of the apparatus in the vehicle body has been completed.

Figure 2:
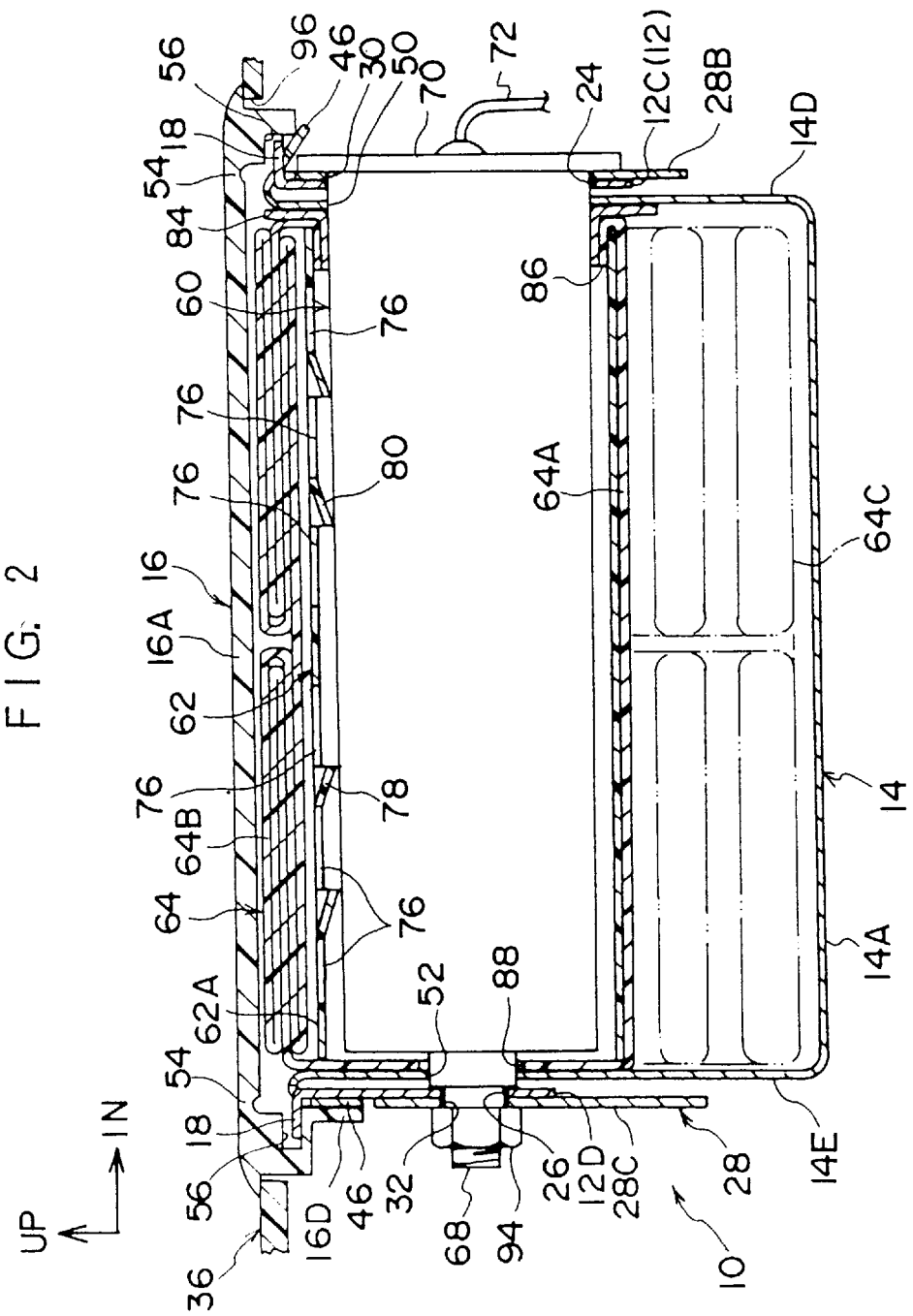
FIG. 2 is an enlarged cross-sectional view taken along line 2—2 in FIG. 3, and illustrates a horizontal cross-sectional structure of the air bag apparatus for a passenger seat shown in FIG. 1.
Figure 3:
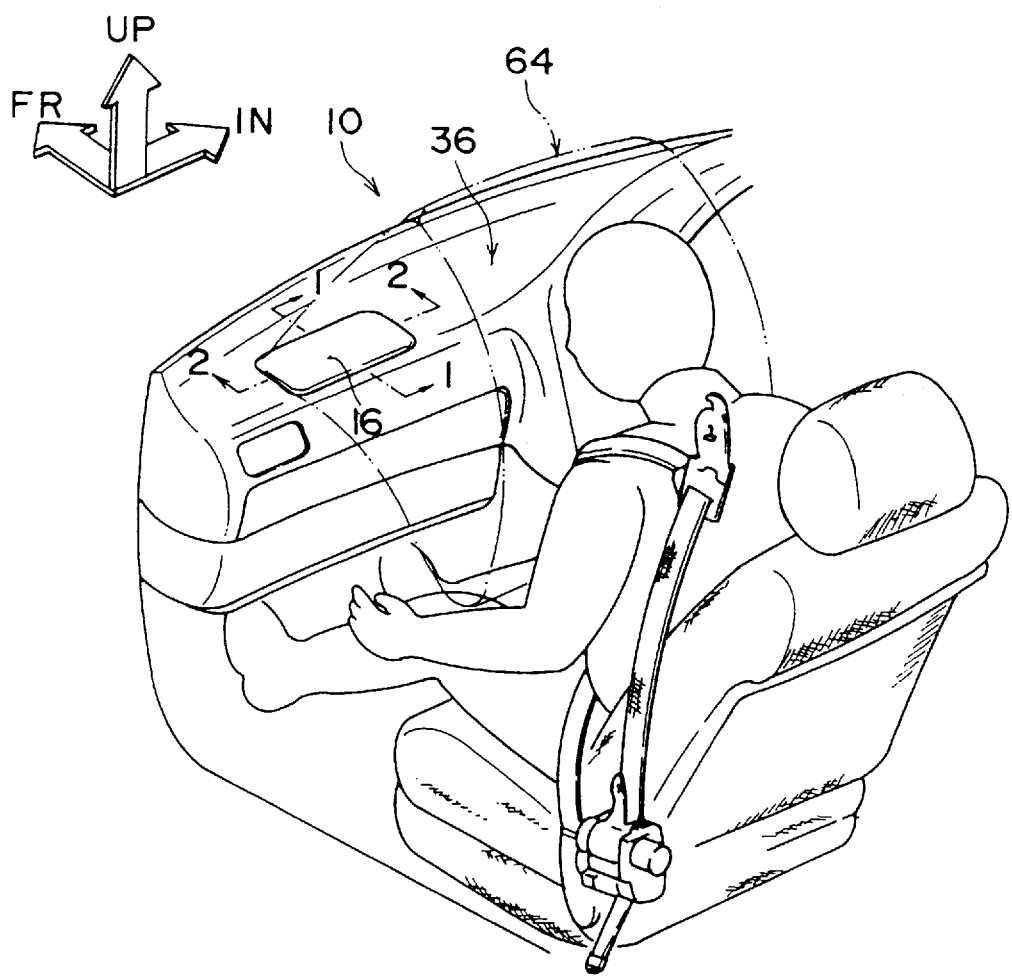
FIG. 3 is a perspective view illustrating a state in which the air bag apparatus for a passenger seat shown in FIG. 1 is mounted at an instrument panel.

FIG. 3 shows a schematic perspective view in which the air bag apparatus 10 for a passenger seat in accordance with this embodiment has been mounted in the instrument panel 36 of the vehicle. FIGS. 1 and 2 respectively show in enlarged form a vertical cross-sectional view, taken along line 1—1 in FIG. 3, and a horizontal cross-sectional view, taken along line 2—2 in FIG. 3, of the air bag apparatus 10 for a passenger seat. Incidentally, as for the diffuser 62 in FIG. 1, cross sections which are parallel with the cross-sectional line are also shown, as necessary, so that essential portions of the diffuser 62 can be ascertained.

As shown in these drawings, the air bag apparatus 10 for a passenger seat in accordance with this embodiment is mounted at a passenger seat-side top portion of the instrument panel 36 of the vehicle. More specifically, in a state in which the attaching bracket 28 on the side of the air bag apparatus 10 for a passenger seat and the mount bracket 40 on the side of the instrument panel reinforcement 38 are fixed to each other by the attaching bolts 42 and the weld nuts 34, the air bag cover 16 is fitted in and closes an opening 96 formed in the passenger seat-side top portion of the instrument panel 36.

Here, as shown in FIG. 1, in the state in which the mounting of the air bag apparatus 10 for a passenger seat has been completed, the thin bag rear portion 64B is disposed in proximity to the reverse surface (underside) of the air bag cover 16, and the diffuser 62 and the inflator 60 are disposed in proximity to the bag rear portion 64B. The thick bag front portion 64C is disposed on the vehicle forward lower side with respect to the diffuser 62 and the inflator 60. That is, as the bag front portion 64C is located on the side of the diffuser 62 and the inflator 60 which is opposite to the side thereof facing the air bag cover 16, the diffuser 62 and the inflator 60 are disposed in a state of being offset toward the air bag cover 16.

In addition, the bag front portion 64C is held mainly by the bottom portion 14A, the front portion 14B, and the rear portion 14C of the accommodating case 14. Further, the interval between the front portion 14B of the accommodating case 14 and the outer peripheral surface of the diffuser 62 and the interval between the rear portion 14C of the accommodating case 14 and the outer peripheral surface of the diffuser 62 are set to be slightly larger than the thickness of a connecting portion for connecting the bag rear portion 64B and the bag front portion 64C.

Further, a corner portion 64D, i.e., a rear end portion, of the bag rear portion 64B is accommodated in an acute angle space 98 which is formed between a rear end portion of the air bag cover 16 and the rear wall portion 12B of the baseplate 12 disposed in an inclined state. The openings 82 in the diffuser 62 are arranged in face-to-face relation to the corner portion 64D. Since the diffuser 62 is arranged in this manner, the eaves portion 83 is disposed in such a manner as to project in a direction toward the rear side of the vehicle.

Next, a description will be given of the procedure for assembling the main constituent elements of the air bag apparatus 10 for a passenger seat. Through the description of the assembling procedure, a description will be given also of the operation and advantages of this embodiment.

First, the accommodating case 14 is placed in the interior of the baseplate 12 which is surrounded by the front wall portion 12A, the rear wall portion 12B, and the side wall portions 12C and 12D. Next, the flanges 18 of the baseplate 12 are inserted into the insertion holes 48 formed in the turned-down portions 46 of the accommodating case 14. Incidentally, since the accommodating case 14 is made of cloth and is very flexible, the operation of assembling the baseplate 12 into the accommodating case 14 can be effected very easily.

In conjunction with this operation, the operation of assembling the diffuser 62 into the bag 64 and the operation of folding the bag 64 are carried out. That is, the diffuser 62 is inserted through the large-diameter hole 86 of the bag 64, and the diffuser 62 is disposed in the holding portion 64A of the bag 64. Next, a peripheral edge portion of the large-diameter hole 86 of the bag 64 is inserted into the interior of the other end of the diffuser 62. In this state, the holding ring 84 is fitted in the other end of the diffuser 62 in a state close to a press-fitted state in such a way that the large-diameter hole 86 portion of the bag 64 is clamped by the holding ring 84 and the diffuser 62. Consequently, the diffuser 62 is fixedly held in the holding portion 64A of the bag 64. Next, in this state, the bag 64 is subjected to primary folding and secondary folding as described above, and the bag 64 is folded up in such a manner as to surround the diffuser 62 so that folded end portions of the portions shown in FIG. 7E are disposed on the side of the diffuser 62 opposite the side facing the air bag cover as shown in FIG. 7G.

Figure 8:
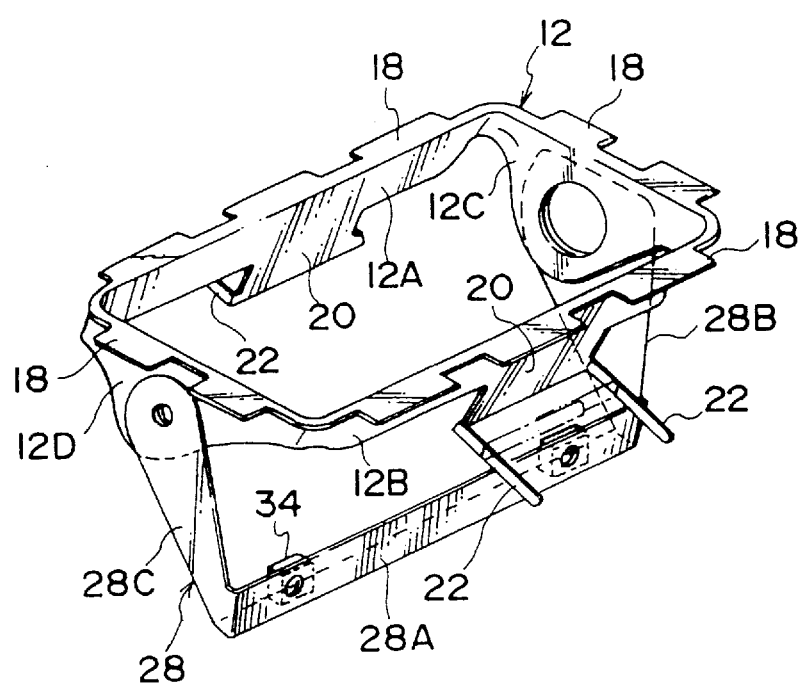
FIG. 8 is a partially enlarged perspective view illustrating another example of pawls of a baseplate shown in FIG. 4.
Figure 9:
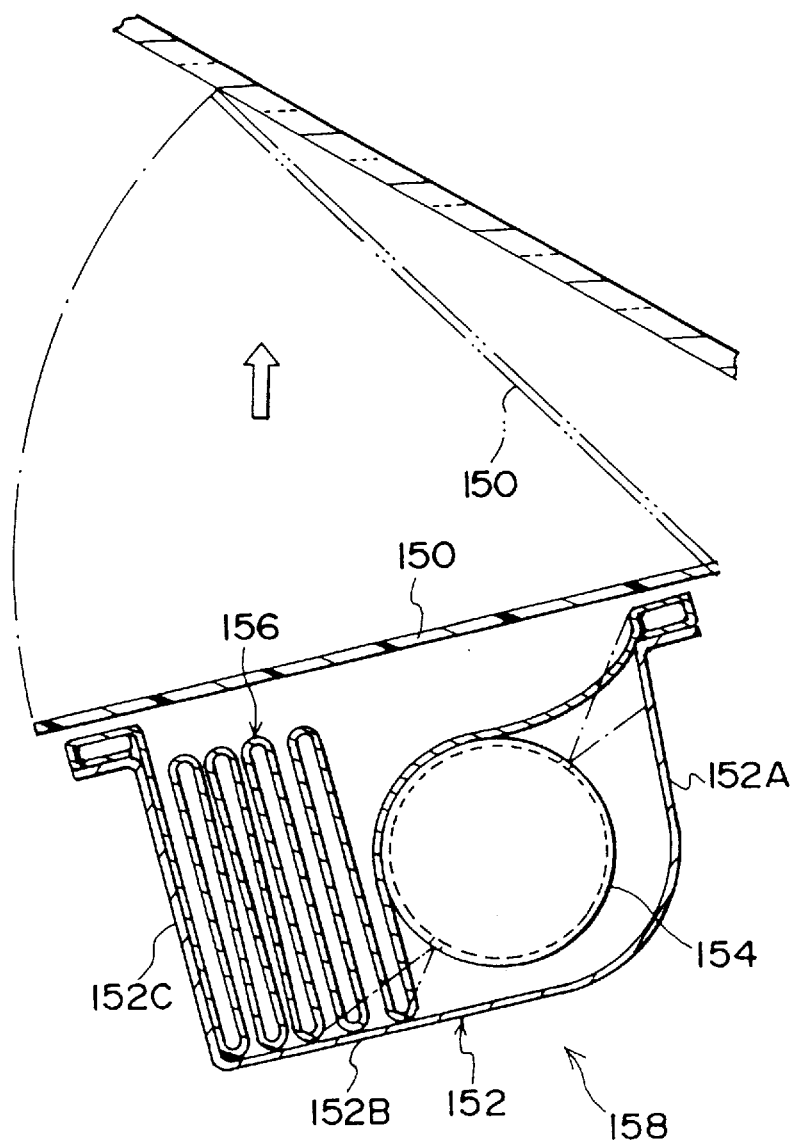
FIG. 9 is a schematic vertical cross-sectional view illustrating an air bag apparatus for a passenger seat in accordance with a first conventional example.
Figure 10:
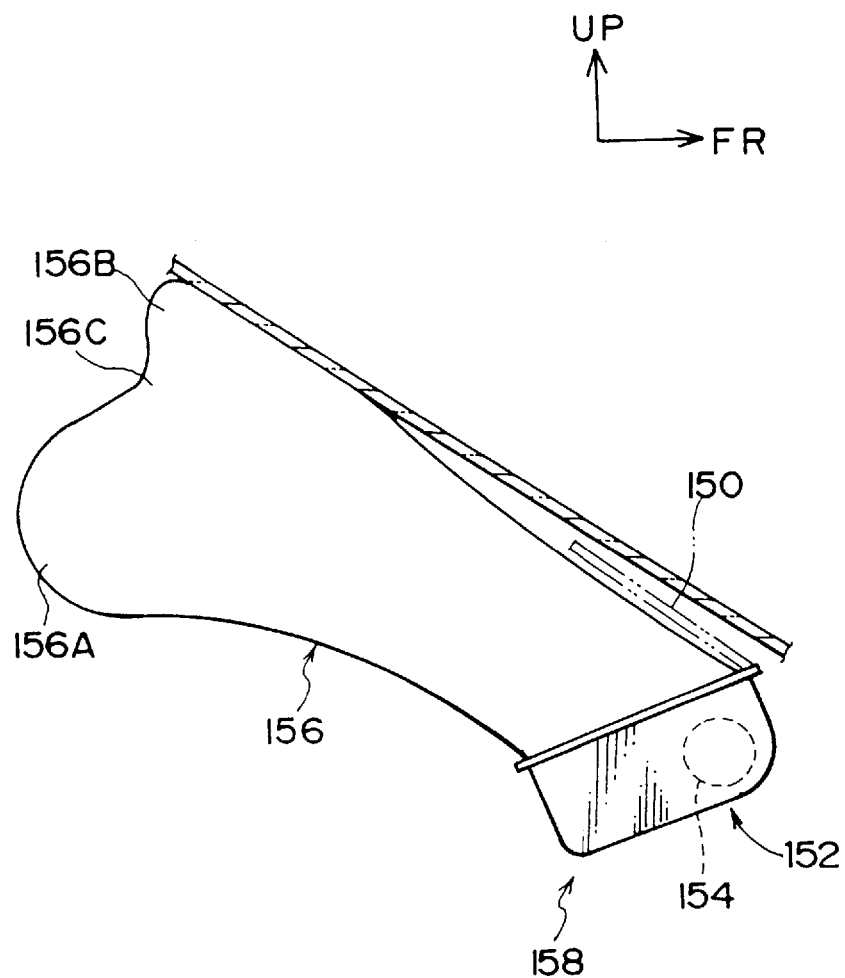
FIG. 10 is a schematic vertical cross-sectional view illustrating the process of inflation of the bag of the air bag apparatus for a passenger seat shown in FIG. 9.
Figure 11:
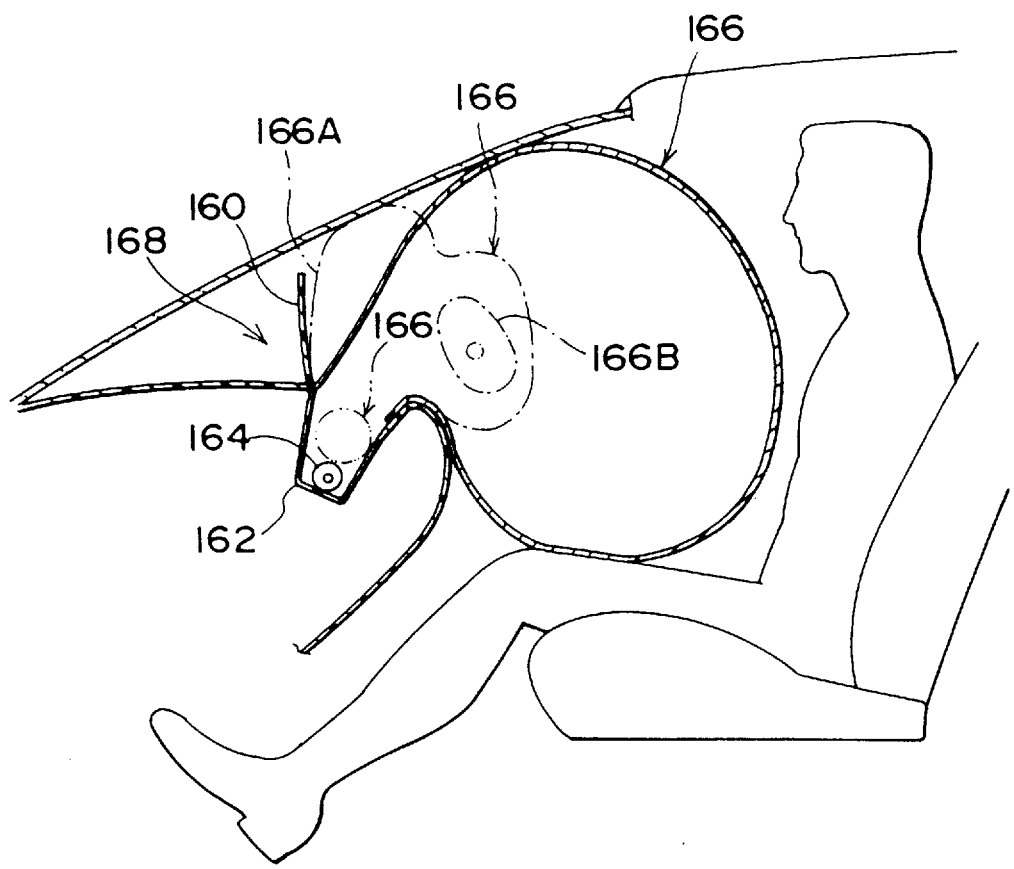
FIG. 11 is a schematic vertical cross-sectional view illustrating an air bag apparatus for a passenger seat in accordance with a second conventional example.
Figure 12:
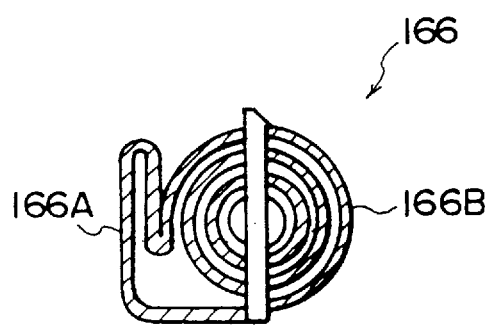
FIG. 12 is a side elevational view illustrating a folded state of the bag of the air bag apparatus for a passenger seat shown in FIG. 11.

Next, the bag 64 with the diffuser 62 assembled thereinto is accommodated in the accommodating case 14. Then, the air bag cover 16 is fitted in the opening of the baseplate 12, and the flanges 18 are inserted into and retained at the retaining grooves 56 at the inner periphery of the top wall 16A by making use of their resiliency. Then, the pawls 22 of the baseplate 12, which are located in an upright state in the grooves 58 of the air bag cover 16, are relatively inserted into insertion holes 92 of narrow belt-shaped retainers 90. Then, the pawls 22 are bent in mutually opposite directions (see the two dotted-dash lines of the pawls in FIG. 4). Incidentally, it is also possible to adopt a method in which the pair of pawls 22 are bent in mutually approaching directions, and tips of the pawls 22 are secured by means of welding or the like, as shown in FIG. 8. In this case, the retainers 90 may be omitted. In this way, the air bag cover 16 is secured to the front wall portion 12A and the rear wall portion 12B of the baseplate 12 by means of the retainers 90, and the deployment load can be transmitted to the instrument panel reinforcement 38 by means of the baseplate 12, the attaching bracket 28, and the mount bracket 40. Thus, the outer frame of the air bag apparatus 10 for a passenger seat is formed by components including the baseplate 12, the accommodating case 14, and the air bag cover 16, and the diffuser 62 and the bag 64, which constitute portions of the functional parts, are accommodated inside the outer frame.

Subsequently, the inflator 60 is fitted. Specifically, the inflator 60 is inserted at the holding ring 84 side of the diffuser 62. Consequently, the main body portion of the inflator 60 is consecutively inserted through the respective large-diameter holes 30, 24, 50, and 86 of the attaching bracket 28, the baseplate 12, the accommodating case 14, and the bag 64, and the threaded portion 68 is consecutively inserted through the respective small-diameter holes 88, 52, 26, and 32 of the the bag 64, the accommodating case 14, the baseplate 12, and the attaching bracket 28. Subsequently, a nut 94 is threadedly engaged on the threaded portion 68 of the inflator 60, thereby securing the inflator 60. Incidentally, the flange 70 of the inflator 60 serves as a stopper.

The air bag apparatus 10 for a passenger seat, for which the assembling operation is thus completed as a single unit, is mounted in the vehicle body by the attaching bolts 42 and the weld nuts 34 by means of the attaching bracket 28 and the mount bracket 40, as described above.

The air bag apparatus 10 for a passenger seat, which is mounted in the above-described manner, operates as described below during a collision. That is, at the time of a collision, a predetermined electric current is applied to the squib of the inflator 60, and gases blow out from the gas ports 66 in the inflator 60. The blow gases are distributed into a main stream gas and an auxiliary stream gas by the diffuser 62 surrounding the inflator 60. Namely, the main stream gas flows out from the pair of openings 82 in the diffuser 62 toward the corner portion 64D of the bag 64. At this time, part of the main stream gas strikes the eaves portion 83 projecting from upper edge sides of the openings 82, and then flows out toward the corner portion 64D. Meanwhile, the auxiliary stream gas passes through the openings 76 in the diffuser 62, and flows out in the leftward and rightward directions by the deflecting plates 78 and 80. As a result, the initial inflating pressure of the bag rear portion 64B (this initial inflating pressure is greater than the breaking load of the breaking portion 54) instantly acts on the breaking portion 54 of the air bag cover 16, breaks the air bag cover 16 at an early period along the breaking portion 54, and breaks open the air bag cover 16 in mutually opposite directions.

As for the bag 64, since the main stream gas which is ejected from the inflator 60 is rectified by the diffuser 62 and flows out in a direction toward the rear side of the vehicle, the bag rear portion 64B is initially inflated toward the waist of the passenger, and the bag front portion 64C is subsequently inflated toward the upper part of the passenger's body. Incidentally, at this time, since the auxiliary stream gas also flows out in the leftward and rightward directions by means of the deflecting plates 78 and 80 of the above-described diffuser 62, the bag rear portion 64B and the bag front portion 64C are inflated as described above, while being inflated also in the leftward and rightward directions from the initial stage of inflation.

In the air bag apparatus 10 for a passenger seat in this embodiment which operates in the above-described manner, the bag rear portion 64B is left in proximity to the air bag cover 16, and the bag front portion 64C is led round to the side of the diffuser 62 and the inflator 60 which is opposite to the side thereof facing the air bag cover 60, with the result that the diffuser 62 and the inflator 60 are disposed in a state of being offset toward the air bag cover 16. Consequently, only the bag rear portion 64B of the bag 64 is present between the inflator 60 and the air bag cover 16. For this reason, the gas pressure from the inflator 60 directly acts on the air bag cover 16 (particularly the breaking portion 54) through the bag rear portion 64B. Therefore, it is possible to break the air bag cover 16 speedily along the breaking portion 54 and deploy the same at a stage where the internal pressure of the overall bag 64 is relatively low. Hence, the inflating speed of the overall bag 64 can be delayed within an appropriate range.

Moreover in this embodiment, since the pair of openings 82 which are provided in the diffuser 62 are disposed in face-to-face relation to the corner portion 64D of the bag rear portion 64B, the gases ejecting from the inflator 60 are adapted to flow out in a direction toward the rear side of the vehicle. Hence, it is possible to allow the bag rear portion 64B to be inflated in a direction toward the rear side of the vehicle and diagonally downward at an early period after the deployment of the air bag cover 16.

That is, with the air bag apparatus 10 for a passenger seat in accordance with this embodiment, early downward inflation of the lower portion of the bag 64 can be made compatible with a decline in the inflating speed of the overall bag 64 within an appropriate range.

In accordance with this embodiment, the accommodating case 14 is disposed in such a manner as to be inclined forward with respect to the vertical direction of the vehicle, and the diffuser 62, the inflator 60, and the bag 64 are accommodated in the accommodating case 14 in a predetermined positional relationship, with the result that the opening 96 of the instrument panel 36 can be made narrow. For this reason, there are advantages in that the quality of appearance can be improved in terms of the decorative design of the instrument panel 36, and restrictions in design can be reduced.

The foregoing are the basic advantages of this embodiment, and other advantages of this embodiment will be described hereafter.

Advantages concerning the arrangement of the diffuser 62 are as follows.

First, in this embodiment, since the hollow cylindrical diffuser 62 is disposed around the inflator 60, and the openings 82 for the efflux of the main stream gas, which is provided in the diffuser 62, are provided in the inclined portion 62B which is offset toward the rear side of the vehicle with respect to the top portion 62A, it is possible to allow the gases ejected from the inflator 60 to flow out in a direction toward the rear side of the vehicle smoothly and efficiently. For this reason, it is possible to promote the speeding up of the timing of deployment of the air bag cover 16, and particularly promote early downward inflation of the lower portion of the bag 64.

Secondly, in this embodiment, since the eaves portion 83 is provided in such a manner as to project from upper edge sides of the openings 82 of the diffuser 62 in a direction toward the rear side of the vehicle, it is possible to allow the gases ejected from the inflator 60 to flow out after being rectified in a direction toward the rear side of the vehicle more smoothly and efficiently. That is, if the eaves portion 83 is not provided, the gases ejected from the inflator 60 flow out from the openings 82 of the diffuser 62 radially with a certain angle. However, since the eaves portion 83 is provided as in this embodiment, the portion of the gases which should flow out radially strikes against the eaves portion 83, and linearly flows out toward a corner portion 64D. Accordingly, it is possible to allow the gases ejected from the inflator 60 to flow out after being rectified in a direction toward the rear side of the vehicle more smoothly and efficiently. Thus, it is possible to further promote the speeding up of the timing of deployment of the air bag cover 16 and early downward inflation of the lower portion of the bag 64. Incidentally, since this eaves portion 83 can be simply fabricated in the process of fabricating the diffuser 62 as described above, an increase in the number of manufacturing steps is not entailed.

Thirdly, in this embodiment, since the deflecting plates 78 and 80 for deflecting the auxiliary stream gas ejected from the inflator 60 in the transverse direction of the vehicle are provided in the diffuser 62, the bag rear portion 64B in the folded state can be unfolded easily, and the bag 64 can be inflated in the leftward and rightward directions (in the transverse direction of the vehicle), so that, from an early stage of inflation, inflation proceeds in a form similar to that of a sphere which is a final inflated shape. As a result, it is possible to improve the performance of restraining the vehicle occupant.

Advantages concerning the arrangement of the accommodating case 14 are as follows.

First, in this embodiment, since the accommodating case 14 is made of cloth, as compared with a case where the accommodating case 14 is made of a metal, the accommodating case 14 can be made very flexible, and the degree of freedom in designing the shape can be enhanced. For this reason, it is unnecessary to pay heed to interference between the accommodating case 14 and surrounding parts (e.g., a duct of a defroster) at the time of mounting the air bag apparatus 10 for a passenger seat in a vehicle. Accordingly, it is possible to improve the efficiency with which the air bag apparatus 10 for a passenger seat is mounted in a vehicle. In addition, since the accommodating case 14 is very flexible as described above, the gap with the surrounding parts can be made narrow, so that the accommodating feature improves.

Secondly, in this embodiment, since the bag front portion 64C, which is led round to the side of the inflator 60 which is opposite to the side thereof facing the air bag cover 60, is held by the bottom portion 14A, the front portion 14B, and the rear portion 14C of the accommodating case 14, the shape of the bag front portion 64C in a folded state can be held easily, and inflation of the bag front portion 64C in the forward lower direction can be prevented. For this reason, it is possible to favorably maintain the shape-retaining characteristic and the inflation performance of the bag 64.

Thirdly, in this embodiment, since the interval between the front portion 14B of the accommodating case 14 and the outer peripheral surface of the diffuser 62 and the interval between the rear portion 14C of the accommodating case 14 and the outer peripheral surface of the diffuser 62 are set to be slightly larger than the thickness of a connecting portion for connecting the bag rear portion 64B and the bag front portion 64C, it is possible to reduce the inflation resistance at the time when the bag front portion 64C is inflated. For this reason, the bag 64 can be inflated smoothly.

Advantages concerning the arrangement of the baseplate 12 are as follows.

First, in this embodiment, since two pairs of pawls 22 are respectively provided on the front wall portion 12A and the rear wall portion 12B of the baseplate 12, and these pawls are bent in mutually opposite or approaching directions, making it possible to fix the accommodating case 14 and the air bag cover 16. Hence, the fixed state of the air bag cover 16 can be stabilized. For this reason, when the air bag cover 16 is deployed, it is possible to prevent a situation in which the air bag cover 16 is bent in the deploying direction more than necessary, and the flanges 18 of the baseplate 12 come off the retaining grooves 56 in the air bag cover 16.

Secondly, since the air bag cover 16 can be secured to the baseplate 12 by simply bending and tightening the pawls 22, it is possible to improve the assembling efficiency.

Thirdly, since the baseplate 12 can be fabricated by blanking using a press and bending, it is possible to reduce the manufacturing cost.

Advantages concerning the arrangement of the bag 64 are as follows.

In this embodiment, since the bag 64 can be set in a folded state by merely subjecting the bag 64 to primary folding and secondary folding, i.e., by merely folding the bag 64 in two stages the bag 64 can be set in such a folded state that the bag front portion 64C is led round to the side of the inflator 60 which is opposite to the side thereof facing the air bag cover 16. Therefore, it is possible to facilitate the operation of folding the bag 64 and make the folded bag 64 compact.

Advantages concerning the overall arrangement of the air bag apparatus 10 for a passenger seat as a unit are as follows.

As described above, in this embodiment, since only one tightening location is used at the threaded portion 68 and the nut 94, the manufacture of the air bag apparatus 10 for a passenger seat is facilitated, and it is possible to improve the manufacturing efficiency.

Although, in this embodiment, an arrangement is adopted in which the diffuser 62 having the predetermined openings 82 is disposed around the inflator 60, so as to allow the gases ejected from the inflator 60 to flow out in a direction toward the rear side of the vehicle, the diffuser 62 is not necessarily required, and it is possible to adopt an arrangement in which the diffuser 62 is not used. In this case, it suffices to adopt, for example, an arrangement in which gas ports are formed only on the rear side of an upper portion of the peripheral surface of the inflator, an arrangement in which gas ports are formed only on the front and rear sides of the upper peripheral surface, and areas of the openings are made large for the gas ports on the rear side, and an arrangement in which, if the rectifying effect of the diffuser 62 is to be obtained, a portion corresponding to the eaves portion 83 is provided integrally with the inflator at an upper edge side of each gas port provided on the rear side by means of cut-out or the like, or similar portions may be subsequently attached in post-processing.

In addition, in this embodiment, the arrangement adopted for the air bag cover 16 is such that the air bag cover 16 is adapted to break along the substantially H-shaped breaking portion 54, and deploys in the manner of a double-leafed hinged door with front and rear edges as centers of rotation. However, the present invention is not limited to the same, and it is possible to adopt an arrangement in which the overall cover deploys toward the windshield glass with only the front edge as the center of rotation.

Further, in this embodiment, an arrangement is adopted in which the air bag cover 16 is fitted later to the opening 96 in the instrument panel 36 at the same time as the air bag apparatus 10 for a passenger seat is mounted in the vehicle. However, the present invention is not limited to the same, and it is possible to adopt an arrangement in which the air bag cover is formed integrally at the time of molding the instrument panel.

Although, in this embodiment, the thin-walled breaking portion 54 is provided to deploy the air bag cover 16, it suffices if the arrangement makes it possible to deploy the air bag cover 16 during a collision, and deployment by breaking is not necessarily required.

Although, in this embodiment, the accommodating case 14 is made of cloth, the accommodating case 14 may be made of a resin or a metal.

Although, in this embodiment, the inflator 60 is formed into a hollow cylindrical shape, the inflator 60 may not necessarily be formed into a hollow cylindrical shape. For instance, it is possible to use a hollow prismal shape or other shapes.

What is claimed is:

1. An air bag apparatus for a passenger seat, comprising:

an air bag cover provided at a top portion of an instrument panel disposed on a passenger seat side of a vehicle, such that said air bag cover is capable of deploying;

an air bag case disposed below said air bag cover and closed by said air bag cover;

a bag accommodated in said air bag case in a folded state;

an inflator disposed in said bag and adapted to inflate said bag toward the passenger seat by ejecting a gas at a time of a collision;

wherein said inflator is disposed in a state of being offset toward said air bag cover with respect to a depthwise intermediate portion of said air bag case, and a portion of said bag is disposed at a side of said inflator which is opposite to a side thereof facing said air bag cover; and rectifying means constructed and arranged to direct the gas ejected from said inflator in a direction predominantly toward a rear side of the vehicle.

2. An air bag apparatus for a passenger seat according to claim 1, said rectifying means being disposed around said inflator and having a rectifying port for rectifying the gas ejected from said inflator, said rectifying port being disposed at a position offset toward the rear side of the vehicle with respect to a top surface portion of said rectifying means.

3. An air bag apparatus for a passenger seat according to claim 2, wherein said rectifying port has an eaves portion which is disposed on an upper edge side thereof and projects in the direction toward the rear side of the vehicle.

4. An air bag apparatus for a passenger seat according to claim 3, wherein said rectifying means has deflecting means at the top surface portion thereof, and said deflecting means deflects, in the transverse direction of the vehicle, a portion of the flow of the gas ejected from said inflator.

5. A method of folding the bag which is applied to the air bag apparatus for a passenger seat according to claim 4, comprising the steps of:

folding as a first step a pair of side portions of said bag along predetermined primary folding lines such that the width of said bag after folding coincides substantially with the width of said rectifying means in a state in which said rectifying means is inserted in a substantially central portion of said bag, thereby setting said bag in a primarily-folded state; and folding as a second step another pair of side portions, whose direction of orientation is perpendicular to that of said first mentioned pair of side portions of said bag, along predetermined secondary folding lines which are perpendicular to the primary folding lines, so as to dispose folded end portions of said another pair of side portions at a side of said rectifying means which is opposite to a side thereof facing said air bag cover, thereby setting said bag in a secondarily-folded state.

6. A method of folding a bag according to claim 5, wherein in said first step and said second step, at least a portion of said bag is folded in a zigzag manner.

7. A method of folding the bag which is applied to the air bag apparatus for a passenger seat according to claim 3, comprising the steps of:

folding as a first step a pair of side portions of said bag along predetermined primary folding lines such that the width of said bag after folding coincides substantially with the width of said rectifying means in a state in which said rectifying means is inserted in a substantially central portion of said bag, thereby setting said bag in a primarily-folded state; and folding as a second step another pair of side portions, whose direction of orientation is perpendicular to that of said first mentioned pair of side portions of said bag, along predetermined secondary folding lines which are perpendicular to the primary folding lines, so as to dispose folded end portions of said another pair of side portions at a side of said rectifying means which is opposite to a side thereof facing said air bag cover, thereby setting said bag in a secondarily-folded state.

8. A method of folding a bag according to claim 7, wherein in said first step and said second step, at least a portion of said bag is folded in a zigzag manner.

9. An air bag apparatus for a passenger seat according to claim 2, wherein said rectifying means has deflecting means at the top surface portion thereof, and said deflecting means deflects, in the transverse direction of the vehicle, a portion of the flow of the gas ejected from said inflator.

10. An air bag apparatus for a passenger seat according to claim 2, wherein said air bag case is made of cloth.

11. An air bag apparatus for a passenger seat according to claim 10, wherein said air bag case includes a bottom wall portion, a front wall portion, a rear wall portion, and a pair of side wall portions, and said air bag case is provided such that the portion of the bag disposed at the side of said inflator which is opposite to the side thereof facing said air bag cover is held by the bottom wall portion, the front wall portion, and the rear wall portion.

12. An air bag apparatus for a passenger seat according to claim 11, wherein said air bag case and said rectifying means are formed such that the widths of a front space between the front wall portion of said air bag case and a front-side outer peripheral surface of said rectifying means and a rear space between the rear wall portion of said air bag case and a rear-side outer peripheral surface of said rectifying means are larger than the thicknesses of portions of said bag in a folded state disposed within said front and rear spaces.

13. A method of folding the bag which is applied to the air bag apparatus for a passenger seat according to claim 2, comprising the steps of:

folding as a first step a pair of side portions of said bag along predetermined primary folding lines such that the width of said bag after folding coincides substantially with the width of said rectifying means in a state in which said rectifying means is inserted in a substantially central portion of said bag, thereby setting said bag in a primarily-folded state; and folding as a second step another pair of side portions, whose direction of orientation is perpendicular to that of said first mentioned pair of side portions of said bag, along predetermined secondary folding lines which are perpendicular to the primary folding lines, so as to dispose folded end portions of said another pair of side portions at a side of said rectifying means which is opposite to a side thereof facing said air bag cover, thereby setting said bag in a secondarily-folded state.

14. A method of folding a bag according to claim 13, wherein in said first step and said second step, at least a portion of said bag is folded in a zigzag manner.

15. An air bag apparatus for a passenger seat according to claim 1, wherein said air bag case is made of cloth.

16. An air bag apparatus for a passenger seat according to claim 15, wherein said air bag case includes a bottom wall portion, a front wall portion, a rear wall portion, and a pair of side wall portions, and said air bag case is provided such that the portion of the bag disposed at the side of said inflator which is opposite to the side thereof facing said air bag cover is held by the bottom wall portion, the front wall portion, and the rear wall portion.

17. An air bag apparatus for a passenger seat according to claim 1, wherein said air bag case includes a bottom wall portion, a front wall portion, a rear wall portion, and a pair of side wall portions, and said air bag case is provided such that the portion of the bag disposed at the side of said inflator which is opposite to the side thereof facing said air bag cover is held by the bottom wall portion, the front wall portion, and the rear wall portion.

18. An air bag apparatus for a passenger seat according to claim 1, further comprising:

an attaching member for attaching said air bag case to a vehicle body.

19. An air bag apparatus for a passenger seat, comprising:

an air bag cover provided at a top portion of an instrument panel disposed on a passenger seat side of a vehicle, such that said air bag cover is capable of deploying;

an air bag case disposed below said air bag cover and closed by said air bag cover;

a bag accommodated in said air bag case in a folded state;

an inflator disposed in said bag and adapted to inflate said bag toward the passenger seat by ejecting a gas at a time of a collision; and rectifying means disposed around said inflator and constructed and arranged to direct the gas ejected by said inflator in a direction predominantly toward a rear side of the vehicle, said rectifying means having a rectifying port for rectifying the gas ejected from said inflator, said rectifying port being disposed at a position offset toward a rear side of the vehicle with respect to a top surface portion of said rectifying means, wherein said inflator is disposed in a state of being offset toward said air bag cover with respect to a depthwise intermediate portion of said air bag case, said inflator is provided such that the gas ejected from said inflator blows out in a direction toward the rear side of the vehicle, and a portion of said bag is disposed at a side of said inflator which is opposite to a side thereof facing said air bag cover.

20. An air bag apparatus for a passenger seat according to claim 19, wherein said rectifying means has an eaves portion which is disposed on an upper edge side of said rectifying port and projects in the direction toward the rear side of the vehicle and has deflecting means at the top surface portion, said deflecting means deflecting, in the transverse direction of the vehicle, a portion of the flow of the gas ejected from said inflator.

21. An air bag apparatus for a passenger seat according to claim 19, wherein said rectifying means has deflecting means at the top surface portion thereof, and said deflecting means deflects, in the transverse direction of the vehicle, a portion of the flow of the gas ejected from said inflator.

22. An air bag apparatus for a passenger seat according to claim 19, wherein said air bag case is made of cloth and includes a bottom wall portion, a front wall portion, a rear wall portion, and a pair of side wall portions, and said air bag case is provided such that the portion of the bag disposed at the side of said inflator which is opposite to the side thereof facing said air bag cover is held by the bottom wall portion, the front wall portion, and the rear wall portion.

23. An air bag apparatus for a passenger seat according to claim 22, wherein said air bag case and said rectifying means are formed such that the widths of a front space between the front wall portion of said air bag case and a front-side outer peripheral surface of said rectifying means and a rear space between the rear wall portion of said air bag case and a rear-side outer peripheral surface of said rectifying means are larger than the thicknesses of portions of said bag in a folded state disposed within said front and rear spaces.

24. An air bag apparatus for a passenger seat according to claim 19, wherein said air bag case includes a bottom wall portion, a front wall portion, a rear wall portion, and a pair of side wall portions, and said air bag case is provided such that the portion of the bag disposed at the side of said inflator which is opposite to the side thereof facing said air bag cover is held by the bottom wall portion, the front wall portion, and the rear wall portion.

25. An air bag apparatus for a passenger seat according to claim 19, further comprising:

an attaching member for attaching said air bag case to a vehicle body.

* * * * *